Patented Feb. 2, 1943

2,310,012

UNITED STATES PATENT OFFICE 2,310,012

METHOD AND COMPOSITION FOR PRODUCING TEXTILE PRINTING EMULSIONS

Norman S. Cassel, Ridgewood, N. J., assignor to Interchemical Corporation, New York, N. Y., a corporation of Ohio No Drawing. Application May 27, 1940,
Serial No. 337,494

4 Claims. (Cl. 8—71)

This invention relates to the production of textile printing pastes and the like comprising water-in-organic phase emulsions, and has particular reference to new and improved methods of producing such emulsions, and compositions useful in the practice of the methods.

In my co-pending application, Serial No. 215,585, (now Patent 2,202,283) I have disclosed novel textile printing compositions comprising emulsions of a type the inner phase of which is a solution of a dye or a dye component, and the outer phase of which is a water-immiscible organic liquid, preferably a solution, in a volatile water-immiscible organic solvent or mixture of solvents, of a water-immiscible substance sufficiently film-forming to be capable of producing stable water-in-organic liquid emulsions, the film-forming substance most preferably constituting not over 5% of the emulsion.

A difficulty with the use of these emulsion printing pastes is the fact that many dye components are unstable in aqueous solution, so that they cannot be stored. This necessitates the production of emulsions in limited quantities, as they are to be used, from such materials in the dry state; this is a painstaking and time-consuming operation which is uneconomical.

I have discovered that stable emulsions of water-soluble dye components can be prepared by reacting a water-insoluble reactant, dispersed in an organic liquid capable of producing a stable water-in-lacquer emulsion, with an aqueous reactant. Since the water-insoluble reactants can be chosen to be stable on storage in the organic liquid, and since the production of the printing paste involves a mere admixture with another liquid, a simple way is provided for the production of small batches of printing pastes from liquid materials.

The water-insoluble reactant may be dispersed in the organic liquid, and the aqueous reactant be emulsified into the organic liquid; but the reactants are preferably dispersed in separate concentrated emulsions, which merely need to be mixed to supply the final product.

The material used as a non-aqueous reactant may be any one of a great number of compounds. Thus, a mixture commonly sold under the names "Rapidogen," "Diagen," etc.) comprises a diazo compound stabilized with an amine containing water-solubilizing groups which make the compound soluble in water, plus a water-insoluble coupling component such as beta hydroxy naphthoic acid and its derivatives. These mixtures are perfectly stable dry, but while relatively stable in solution, do lose color strength on storage in aqueous solution. They are conventionally dissolved by treating the mixture with caustic solution, which converts the coupling component to a soluble salt. By dispersing such a mixture in a non-aqueous system and then emulsifying in an aqueous alkali solution, rapid reaction can be obtained with the formation of a satisfactory printing emulsion. Typical examples of this procedure are the following:

Example 1

| | Parts |
|---|---|
| Rapidogen Brown (General Dyestuff Corp. U. S. P. No. 1,822,561) | 20 |
| is dispersed on a three-roll mill in | |
| 500 centipoise standard ethoxy ethyl cellulose | 4 |
| dissolved in | |
| Solvesso #3 (hydrogenated petroleum solvent—boiling range 175–210° C.) | 69 |
| and | |
| Pine oil | 7 |

This is stable on storage.

This dispersion can be made into an excellent printing paste by adding—

| | Parts |
|---|---|
| Above dispersion | 21.6 |
| to | |
| Solvesso #3 (hydrogenated petroleum solvent—boiling range 175–210° C.) | 14.7 |
| then emulsifying into the above | |
| Water, mixed with 50% caustic soda solution | |
| Water | 61.4 |
| Caustic soda solution | 2.3 |

The caustic reacts with the coupling component to produce the finished paste.

Example 2

| | Parts |
|---|---|
| Rapidogen Green B (General Dyestuff Corp. U. S. P. No. 1,882,560) | 30 |
| is dispersed on a three-roll mill into | |
| 500 centipoise standard ethoxy cellulose | 4 |
| dissolved in | |
| Solvesso #3 (hydrogenated petroleum solvent—boiling range 175–210° C.) | 59 |
| and | |
| White pine oil | 7 |

A printing paste can be made as in Example 1 from:

| | Parts |
|---|---|
| Above dispersion | 14.3 |
| Solvesso #3 (hydrogenated petroleum solvent—boiling range 175–210° C.) | 22.0 |
| Water | 61.4 |
| mixed with | |
| 50% caustic soda solution | 2.3 |

The caustic reacts as in Example 1.

Example 3

| | Parts |
|---|---|
| The dyestuff of Example 2 | 12 |
| is dispersed in a solution of | |
| 15' milled crepe rubber | 23 |
| Solvesso #2 (hydrogenated petroleum solvent—boiling range 135-177° C.) | 62 |

This dispersion makes an excellent printing paste with—

| | Parts |
|---|---|
| Above dispersion | 30 |
| Solvesso #2 (hydrogenated petroleum solvent—boiling range 135-177° C.) | 39 |
| 40° Bé. NaOH solution | 1.5 |
| Water | 29.5 |

The printing pastes of Examples 1 to 3, inclusive, can be fixed on the fabric by the conventional methods used for the type of dyestuff disclosed—namely, by the exposure to acid fumes in an "acid ager."

Instead of using a mixture of a water-soluble stabilized diazo compound, and an insoluble coupling component, I may use a water-insoluble stabilized diazo compound, or some other aromatic amino compound capable of producing a diazo compound on reaction, and react it in the same way. Thus, I prepare an emulsion comprising—

Example 4

| | Parts by weight |
|---|---|
| Alkyd resin (35% soya modified glycerol phthalate) | 1.0 |
| Solvesso #2 | 31.0 |
| Dianisidine, tetrazotized and coupled with dimethyl amine to form a water-insoluble diazo-imino compound soluble in Solvesso #2 to some extent | 19.0 |
| Water | 49.0 |

This emulsion, which is stable on storage, is mixed before use with three times its own weight of an emulsion comprising—

| | Parts by weight |
|---|---|
| Above resin | 5.0 |
| Solvesso #2 | 15.0 |
| 32° Bé. HCl | 23.2 |
| Water | 56.8 |

The mixed emulsion requires about ten minutes for the completion of the reaction between the hydrochloric acid and the diazoimino compound to produce an aqueous solution of the dianisidine tetrazo salt; the resultant emulsion is ready to print, or it may be further reduced with emulsion containing no dye, as desired. Here we have a reaction which produces a paste printable on fabrics impregnated with a coupling component for the diazo salt produced.

Example 5

The original diazoimino emulsion of Example 4 may be treated direct with aqueous acid, to produce a very strong solution of the tetrazo salt dispersed as the inner phase of the emulsion, which requires the addition of further clear emulsion, both to stabilize it and to dilute the color for printing.

In addition to working with simple neutralization reactions such as are involved in Examples 1 to 3, and with hydrolyses such as are involved in Examples 4 and 5, more involved reactions may be carried out, such as diazotization. This makes possible using a solution of an azotizable amine in an emulsifiable liquid, or an emulsion of such a solution, adding the desired reactants just before printing, and avoiding any necessity for stabilizing the diazo compound. Typical examples of this phase of my invention are the following:

Example 6

| | Parts by weight |
|---|---|
| Blue B Base (dianisidine) | 0.5 |
| are added to a mixture of— | |
| Alkyd resin solution | 3.0 |
| Pine oil | 5.0 |
| Solvesso #3 (hydrogenated petroleum naphtha—boiling range 175-210° C.) | 19.9 |

The alkyd resin solution is made by reacting 148 phthalic anhydride, 110 glycerol and 125 castor oil fatty acids to 230° C., in the presence of carbon dioxide until the acid number is about 8, and then reducing to 50% non-volatile with a mixture of 30 pine oil and 70 Solvesso #3 (hydrogenated petroleum naphtha—boiling range 135-177° C.). This is a stable liquid. A printing paste may be prepared from this by adding, while stirring—

| | Parts by weight |
|---|---|
| HCl (29° Tw.) | 1.3 |
| in | |
| Water at 80° C. | 20.0 |

The emulsion formed is then cooled to about 0° C. to 5° C., and

| | Parts by weight |
|---|---|
| NaNO₂ | 0.3 |
| in | |
| Water at 0-5° C. | 50.0 | is emulsified into it.

Diazotization proceeds rapidly, along with emulsification. The paste is ready for printing in about thirty minutes, and may be applied to a fabric impregnated, for example, with the anilide of beta-oxy-naphthoic acid. If desired, the reaction may be stopped after the acid and water are added, and the resultant emulsion stored. On addition of the nitrite, diazotization can proceed.

Example 7

Blue B B Base (4 benzoyl amino 2.5 diethoxy aniline)

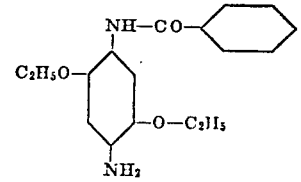

is added to the organic phase of

| | Parts by weight |
|---|---|
| Ethyl cellulose (250 centipoise) | 0.8 |
| Pine oil | 3.0 |
| Xylol | 8.2 |
| Solvesso #3 | 25.0 |

Into this is emulsified

| | |
|---|---|
| NaNO₂ | 0.4 |
| in | |
| Water at 0-5° C. | 39.3 |
| and | |
| HCl (29° Tw) | 1.7 |
| in | |
| Water at 0-5° C. | 20.0 | is then added.

Diazotization is complete in 15-30 minutes.

While I have shown but a few examples of my invention, it is obvious that examples may be multiplied indefinitely without departing from the scope thereof. The invention, while particularly applicable to the production of emulsion printing pastes, may obviously be used for the production of other emulsions in which the emulsion is to carry a product of the reaction of a water-soluble and a water-insoluble reactant.

The continuous phase used should obviously be chosen to withstand the action of the acid, alkali or other chemicals used in preparing the paste for printing. The solvent or solvent mixture chosen should be water-immiscible, although the presence of small amounts of water-miscible solvents in a water-immiscible mixture is permissible. The dissolved substance should be sufficiently film-forming in the solvent to be capable of producing a satisfactory emulsion; most water-insoluble film-formers may be used, including bodied oils, soluble heavy metal soaps, natural resins such as dammar, artificial resins such as alkyd, hydrophobe urea, cumarone indene, cellulose esters such as cellulose acetate and cellulose nitrate, cellulose ethers such as benzyl and ethyl cellulose, and natural and synthetic rubber and rubber derivatives.

It is desirable, of course, that the external phase be kept at a minimum, and that the film-forming substance be kept as low as possible. Amounts above 5% tend to reduce color value due to dyeing of the substance.

This application is in part a continuation of my applications Serial No. 284,210, filed July 13, 1939, Serial No. 285,969, filed July 22, 1939, and Serial No. 313,202, filed January 10, 1940 (now U. S. Patent No. 2,238,855).

I claim:

1. The method of producing a textile printing paste comprising an emulsion whose inner phase is an aqueous solution of a water-soluble compound which can be coupled with another compound to form an azo dyestuff which yields fast dyeings on cotton, and whose outer phase is a water-immiscible solution of an organic water-insoluble film-forming agent in a volatile water-immiscible organic solvent, from a water-soluble reactant and a relatively water-insoluble reactant which will react with the water-soluble reactant to produce the water-soluble compound, which comprises mixing an aqueous solution of the water-soluble reactant with a water-immiscible solution of an organic water-insoluble film-forming agent in a volatile water-immiscible organic solvent, which solution has distributed through it the water-insoluble reactant, to emulsify the water in the water-immiscible solution.

2. The method of claim 1, in which the solution of the water-soluble reactant is emulsified into the dispersion of the water-insoluble reactant.

3. The method of claim 1, in which the solution of the water-soluble reactant is added to the dispersion of the water-insoluble reactant as a water-inorganic liquid emulsion.

4. The method of claim 1, in which the water-insoluble reactant is dissolved in the outer organic phase.

NORMAN S. CASSEL.